(12) United States Patent
Staton

(10) Patent No.: US 9,927,924 B2
(45) Date of Patent: Mar. 27, 2018

(54) DIFFERENTIAL SENSING FOR A TOUCH PANEL

(75) Inventor: Kenneth Lawrence Staton, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 1096 days.

(21) Appl. No.: 12/239,594

(22) Filed: Sep. 26, 2008

(65) Prior Publication Data

US 2010/0079401 A1    Apr. 1, 2010

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
USPC ........................................... 345/174
See application file for complete search history.

(56) References Cited

U.S. PATENT DOCUMENTS

| | | |
|---|---|---|
| 4,859,814 A | 8/1989 | Sciacero et al. |
| 5,355,149 A | 10/1994 | Casebolt |
| 5,483,261 A | 1/1996 | Yasutake |
| 5,488,204 A | 1/1996 | Mead et al. |
| 5,495,077 A | 2/1996 | Miller et al. |
| 5,818,672 A | 10/1998 | Hilbe |
| 5,825,352 A | 10/1998 | Bisset et al. |
| 5,835,079 A | 11/1998 | Shieh |
| 5,880,411 A | 3/1999 | Gillespie et al. |
| 5,914,465 A * | 6/1999 | Allen et al. ................ 178/18.06 |
| 5,923,320 A | 7/1999 | Murakami et al. |

(Continued)

FOREIGN PATENT DOCUMENTS

| | | |
|---|---|---|
| CN | 1164286 A | 11/1997 |
| CN | 101604218 A | 12/2009 |

(Continued)

OTHER PUBLICATIONS

International Search Report dated Feb. 23, 2011, for PCT Application No. PCT/US2009/057850, filed Sep. 22, 2009, four pages.

(Continued)

*Primary Examiner* — Ilana Spar
*Assistant Examiner* — Kirk Hermann
(74) *Attorney, Agent, or Firm* — Morrison & Foerster LLP

(57) ABSTRACT

A touch panel can configured to reduce adverse effects associated with noise that can be injected into the panel when touched by performing a sensing operation at each sensor in both a panel-stimulated and non panel-stimulated state. The touch panel can detect a touch event by sensing touch in a non-stimulated state to quantify a noise level injected into the touch panel by the touch, and subtracting that noise level from a detection signal sensed in the stimulated state. In one embodiment, a sensing operation can be performed for a particular sensor at two successive time periods—one for each state—within a single scan cycle. In another embodiment, a sensing electrode configuration can be provided that enables a sensing operation to be performed for a particular sensor in both a panel-stimulated and non panel-stimulated state concurrently.

25 Claims, 8 Drawing Sheets

(56) References Cited

U.S. PATENT DOCUMENTS

| | | |
|---|---|---|
| 6,188,391 B1 | 2/2001 | Sealy et al. |
| 6,310,610 B1 | 10/2001 | Beaton et al. |
| 6,310,611 B1 | 10/2001 | Caldwell |
| 6,323,846 B1 | 11/2001 | Westerman et al. |
| 6,452,514 B1 | 9/2002 | Philipp |
| 6,570,441 B1 | 5/2003 | Sasaki |
| 6,690,387 B2 | 2/2004 | Zimmerman et al. |
| 7,015,894 B2 | 3/2006 | Morohoshi |
| 7,057,909 B2 | 6/2006 | Fujisaki et al. |
| 7,109,978 B2 | 9/2006 | Gillespie et al. |
| 7,129,714 B2 | 10/2006 | Baxter |
| 7,184,064 B2 | 2/2007 | Zimmerman et al. |
| 7,298,803 B2 | 11/2007 | Alexander |
| 7,663,607 B2 | 2/2010 | Hotelling et al. |
| 8,415,958 B2 | 4/2013 | Hargreaves et al. |
| 8,479,122 B2 | 7/2013 | Hotelling et al. |
| 8,614,690 B2 | 12/2013 | Grunthaner |
| 9,164,620 B2 | 10/2015 | Hotelling |
| 2001/0015711 A1 | 8/2001 | Aoki |
| 2001/0040545 A1 | 11/2001 | Mishima et al. |
| 2003/0127984 A1 | 7/2003 | Kim et al. |
| 2003/0177349 A1 | 9/2003 | Hersh |
| 2004/0095333 A1 | 5/2004 | Morag et al. |
| 2004/0189617 A1 | 9/2004 | Gerpheide et al. |
| 2005/0041018 A1 | 2/2005 | Philipp |
| 2005/0122119 A1 | 6/2005 | Barlow |
| 2005/0189154 A1 | 9/2005 | Perski et al. |
| 2005/0253598 A1* | 11/2005 | Kawahata ............ 324/671 |
| 2005/0271326 A1 | 12/2005 | Luo |
| 2006/0007171 A1 | 1/2006 | Burdi et al. |
| 2006/0017710 A1 | 1/2006 | Lee et al. |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2006/0284639 A1 | 12/2006 | Reynolds |
| 2007/0046648 A1 | 3/2007 | Lee et al. |
| 2007/0074914 A1* | 4/2007 | Geaghan et al. ........ 178/18.06 |
| 2007/0079996 A1 | 4/2007 | Lee et al. |
| 2007/0257894 A1 | 11/2007 | Philipp |
| 2007/0258172 A1 | 11/2007 | Thein et al. |
| 2007/0268272 A1 | 11/2007 | Perski et al. |
| 2008/0006453 A1 | 1/2008 | Hotelling |
| 2008/0007529 A1 | 1/2008 | Paun et al. |
| 2008/0047764 A1 | 2/2008 | Lee et al. |
| 2008/0062139 A1 | 3/2008 | Hotelling et al. |
| 2008/0088595 A1 | 4/2008 | Liu et al. |
| 2008/0100586 A1 | 5/2008 | Smart |
| 2008/0127739 A1* | 6/2008 | DeAngelis et al. ........... 73/718 |
| 2008/0157893 A1 | 7/2008 | Krah |
| 2008/0158174 A1 | 7/2008 | Land et al. |
| 2008/0158175 A1 | 7/2008 | Hotelling et al. |
| 2008/0158176 A1 | 7/2008 | Land et al. |
| 2008/0158178 A1* | 7/2008 | Hotelling et al. ........... 345/173 |
| 2008/0158182 A1 | 7/2008 | Westerman |
| 2008/0164076 A1* | 7/2008 | Orsley ............ 178/18.01 |
| 2008/0180399 A1 | 7/2008 | Cheng |
| 2008/0246496 A1 | 10/2008 | Hristov et al. |
| 2008/0278178 A1* | 11/2008 | Philipp ............ 324/662 |
| 2009/0085894 A1* | 4/2009 | Gandhi et al. ............ 345/175 |
| 2009/0127003 A1 | 5/2009 | Geaghan |
| 2009/0129112 A1 | 5/2009 | Shamitz et al. |
| 2009/0153152 A1 | 6/2009 | Maharyta et al. |
| 2010/0066391 A1 | 3/2010 | Hirasaka et al. |
| 2010/0073301 A1 | 3/2010 | Yousefpor et al. |
| 2010/0079402 A1 | 4/2010 | Grunthaner |
| 2010/0085322 A1 | 4/2010 | Mamba et al. |
| 2010/0110038 A1 | 5/2010 | Mo et al. |
| 2010/0220075 A1 | 9/2010 | Kuo et al. |
| 2010/0238133 A1 | 9/2010 | Wu et al. |
| 2010/0259502 A1 | 10/2010 | Ema et al. |
| 2010/0271330 A1 | 10/2010 | Philipp |
| 2010/0301879 A1 | 12/2010 | Philipp |
| 2010/0307840 A1 | 12/2010 | Kobayashi et al. |
| 2010/0321043 A1 | 12/2010 | Philipp et al. |
| 2011/0022351 A1* | 1/2011 | Philipp et al. ............ 702/150 |
| 2011/0175823 A1 | 7/2011 | Vieta |
| 2011/0298746 A1 | 12/2011 | Hotelling |
| 2012/0026123 A1 | 2/2012 | Grunthaner et al. |
| 2016/0018946 A1 | 1/2016 | Hotelling |

FOREIGN PATENT DOCUMENTS

| | | |
|---|---|---|
| EP | 0 684 580 A2 | 11/1995 |
| EP | 0 684 580 A3 | 11/1995 |
| EP | 0 706 147 A2 | 4/1996 |
| EP | 0 706 147 A3 | 4/1996 |
| EP | 0 706 147 B1 | 4/1996 |
| EP | 1 496 467 A2 | 1/2005 |
| EP | 1 496 467 A3 | 1/2005 |
| EP | 1496467 A2 * | 1/2005 |
| JP | 05-006153 A | 1/1993 |
| JP | 09-018321 A | 1/1997 |
| JP | 09-292950 A | 11/1997 |
| JP | 10-312244 A | 11/1998 |
| JP | 2000-163031 A | 6/2000 |
| JP | 2002-342033 A | 11/2002 |
| JP | 2007-157371 A | 6/2007 |
| WO | WO-2005/114369 A2 | 12/2005 |
| WO | WO-2005/114369 A3 | 12/2005 |
| WO | WO-2009/000289 A1 | 12/2008 |
| WO | WO-2009/027629 A1 | 3/2009 |
| WO | WO 2009027629 A1 * | 3/2009 |
| WO | WO-2010/036649 A2 | 4/2010 |
| WO | WO-2010/036651 A2 | 4/2010 |
| WO | WO-2012/015707 A1 | 2/2012 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated May 3, 2011, for PCT Application No. PCT/US2009/057853, filed Sep. 22, 2009, six pages.

Non-Final Office Action dated Aug. 24, 2011, for U.S. Appl. No. 12/239,622, filed Sep. 26, 2008, 22 pages.

Final Office Action dated Mar. 30, 2012, for U.S. Appl. No. 12/239,622, filed Sep. 26, 2008, 17 pages.

Final Office Action dated May 15, 2013, for U.S. Appl. No. 12/239,622, filed Sep. 26, 2008, 24 pages.

Non-Final Office Action dated Mar. 7, 2013, for U.S. Appl. No. 12/239,622, filed Sep. 26, 2008, 22 pages.

Notice of Allowance dated Sep. 10, 2013, for U.S. Appl. No. 12/239,622, filed Sep. 26, 2008, 14 pages.

Final Office Action dated Jul. 1, 2013, for U.S. Appl. No. 12/877,061, filed Sep. 7, 2010, 14 pages.

Non-Final Office Action dated Dec. 21, 2012, for U.S. Appl. No. 12/877,061, filed Sep. 7, 2010, 13 pages.

Non-Final Office Action dated Mar. 27, 2014, for U.S. Appl. No. 12/877,061, filed Sep. 7, 2010, 14 pages.

Final Office Action dated Aug. 5, 2013, for U.S. Appl. No. 12/848,032, filed Jul. 30, 2010, 16 pages.

International Search Report dated Sep. 16, 2011, for PCT Application No. PCT/US11/45120, filed Jul. 22, 2011, three pages.

Non-Final Office Action dated Feb. 6, 2013, for U.S. Appl. No. 12/848,032, filed Jul. 30, 2010, 15 pages.

Partial European Search Report dated Mar. 21, 2012, for EP Application No. 11175801.7, eight pages.

(56) References Cited

OTHER PUBLICATIONS

Final Office Action dated Nov. 28, 2014, for U.S. Appl. No. 12/877,061, filed Sep. 7, 2010, 16 pages.
Non-Final Office Action dated Mar. 9, 2017, for U.S. Appl. No. 14/868,125, filed Sep. 28, 2015, 16 pages.

* cited by examiner

DIFFERENTIAL SENSING FOR A TOUCH PANEL

FIELD OF THE INVENTION

This relates generally to touch panels used as input devices for computing systems, and more particularly, to improving touch panel detection when a touch on the panel causes noise to be injected into the touch panel's sensing elements.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Some touch sensor panels can operate based on mutual capacitance. Mutual capacitance refers to the ability of two conducting drive and sense surfaces, arranged closely together but not directly coupled, to store a charge when a voltage is applied across them. In mutual capacitance touch sensor panels, for example, each of a number of sensors or pixels (representing a particular location on the touch screen) can be formed from opposing conducting elements arranged closely together. A particular sensor can be formed between a driving element (e.g. an arrangement of conductive drive traces formed as "fingers") coupled to a drive line, and a sensing element (e.g. an arrangement of conductive sense traces formed as fingers) coupled to a sense line. When a stimulation source stimulates the drive line with a voltage at a particular frequency, the stimulus essentially injects a charge across the drive and sense elements due to their mutual capacitance. A sense or charge amplifier can sense the charge injected into the sensing element via the sense line. Further, the sensing element can be arranged so that a touch by a user's finger or other object at that particular sensor location can form a capacitance pathway between the driving element and earth ground through the user's body, causing some of the driving element's charge to escape to ground and reducing the charge coupled across to the sense element. The touch sensor panel can therefore detect touch based on changes to the level of charge sensed on the sensing element. A higher level of charge can indicate no touch on the panel, while a lower level of charge can indicate a touch on the panel.

As common in electronic devices, a certain amount of noise or electrical interference can exist in the touch sensor panel. Such noise can be common to the panel's conducting parts relative to the device ground, and can be referred to as common mode noise. Common mode noise in touch sensor panels can be coupled along paths that have parasitic or stray capacitances, such as between the driving and sensing elements and between the drive and sense lines. Because common mode noise tends to be relatively small and evenly distributed across the panel, it provides a relatively minor impact, if any, on the operation of the panel. However, a larger noise source that is not evenly distributed across the panel can impact the operation of the touch sensor panel.

SUMMARY OF THE INVENTION

A touch panel configured to reduce adverse effects associated with noise that can be injected into the panel when touched is disclosed. Adverse effects may include, for example, false touch readings for untouched locations on the touch panel, and saturation of the touch detection circuitry preventing recognition of a touch.

Touch detection circuitry according to embodiments of the invention can reduce the adverse effects of the injected noise by performing a sensing operation at each sensor in both a panel-stimulated and non panel-stimulated state. By sensing in a non-stimulated state, a baseline detection signal can be established. This baseline signal can be compared against a signal generated by sensing in the stimulated state to determine whether a touch event has occurred. Unlike conventional touch panels that sense touch only when a stimulus is applied to the sensor, a touch panel according to embodiments of the invention can detect a touch event by sensing touch in a non-stimulated state to quantify a noise level injected into the touch panel by the touch, and subtracting that noise level from a detection signal sensed in the stimulated state.

In one embodiment, a sensing operation can be performed for a particular sensor at two successive time periods within a single scan cycle. In one time period, a sensing operation can be performed without the corresponding drive line being stimulated. In the other time period, the sensing operation can be performed with the corresponding drive line being stimulated.

In another embodiment, a sensing electrode configuration can be provided that enables a sensing operation to be performed for a particular sensor in both a panel-stimulated and non panel-stimulated state concurrently. In this configuration, driving and sensing elements can be arranged relative to one another such that, when the driving element is stimulated and a finger is touching the touch panel surface at the location of the sensor, a capacitance formed between the finger and a first sensing element of the sensor is substantially similar to a capacitance formed between the finger and a second sensing element of the sensor, and a capacitance formed between the driving element and the second sensing element is substantially less than a capacitance formed between the driving element and the first sensing element.

DETAILED DESCRIPTION OF THE PREFERRED EMBODIMENTS

Figure 1A:
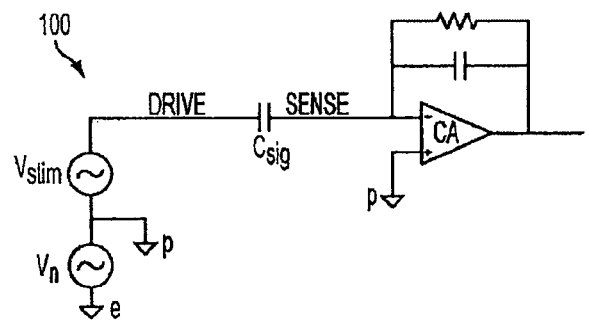
FIG. 1A illustrates an exemplary sensing configuration exposed to common mode noise in a steady-state (no-touch) condition according to one embodiment of the invention.

In the following description of preferred embodiments, reference is made to the accompanying drawings where it is shown by way of illustration specific embodiments in which the invention can be practiced. It is to be understood that other embodiments can be used and structural changes can be made without departing from the scope of the embodiments of this invention.

This relates to improving touch panel detection when the act of touching the panel causes noise to be injected into the panel's sensing elements. Such noise can adversely affect the operation of a touch panel. Depending on the configuration of the touch panel, adverse effects may include, for example, false touch readings for untouched locations on the touch panel, and saturation of the touch detection circuitry preventing recognition of a touch.

A touch panel can reduce the adverse effects of the injected noise by performing a sensing operation at each sensor (pixel) in both a stimulated and non-stimulated state. By sensing in a non-stimulated state, a baseline detection signal can be established. This baseline signal can be compared against a signal generated by the pixel in the stimulated state to determine whether a touch event has occurred. Unlike conventional touch panels that detect touch events only when stimulated, a touch panel that detects touch events in a non-stimulated state can quantify a noise level injected into the touch panel by a touch event, and subtract that noise level from a detection signal sensed in the stimulated state to detect a touch.

Although some embodiments of this invention may be described and illustrated herein in terms of an interfering noise source having common mode noise on the touch panel that is referenced to earth ground, it should be understood that embodiments of this invention are not so limited, but are generally applicable to any noise source that can interfere with the panel's sensing elements when introduced in the touched condition, such as noise introduced from the body of a person touching the panel (e.g., when a user touches the panel while holding a high-power hair dryer in the other hand, for example). Furthermore, although embodiments of the invention may be described and illustrated herein in terms of sense lines and drive lines occupying different layers, it should be understood that embodiments of the invention are also applicable to other touch sensor panel configurations, such as configurations in which the drive and sense lines occupy the same layer or are formed on different layers on the same side of a substrate.

Multi-touch touch-sensitive panels according to one embodiment of this invention can detect multiple touches (touch events or contact points) that occur at about the same time (and at different times), and identify and track their locations. Touch sensor panels are disclosed in U.S. application Ser. No. 11/649,998, filed Jan. 3, 2007 and entitled "PROXIMITY AND MULTI-TOUCH SENSOR DETECTION AND DEMODULATION," the contents of which are incorporated herein by reference in its entirety for all purposes.

Embodiments of the invention relate to reducing adverse effects associated with noise that can be injected into a touch panel when touched. For example, a touch can inject noise into the panel by providing a return path to earth ground, through the user touching the panel, for common mode noise in the panel that is referenced to earth ground. This common mode noise source can be provided when a device including the touch panel, such as a portable computing device for example, is plugged into a wall outlet with a 2-prong power cord (to recharge the device's batteries, for example). In this situation, any common mode noise that couples to both the active and neutral wires of the outlet relative to earth ground (e.g., from lightning, radio transmitters, vacuum cleaners, etc.) can enter the device. Since the 2-prong power cord lacks the third grounding prong to provide a pathway from device ground to earth ground to remove this noise, the noise can capacitively couple to earth ground through the finger and body of a user when the finger touches the panel. In effect, the touch of the panel by the user turns common mode noise, which usually does not cause adverse effects to touch panel operation, into single-ended noise, which can significantly affect touch panel operation.

Figure 1B:
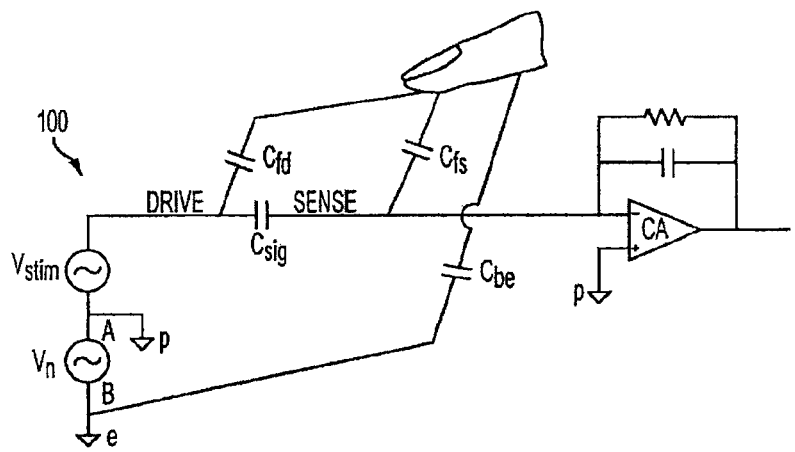
FIG. 1B illustrates an exemplary sensing configuration exposed to injected noise in a dynamic (touch) condition according to one embodiment of the invention.
Figure 1C:
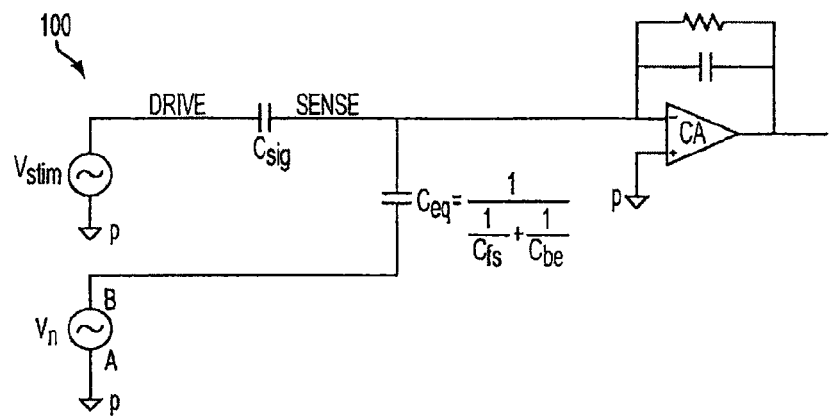
FIG. 1C illustrates an exemplary sensing configuration exposed to injected noise in a dynamic (touch) condition according to one embodiment of the invention.

FIGS. 1A-1C illustrate sensing configuration 100 in which common mode noise on the touch panel in a steady-state (no-touch) condition, as shown in FIG. 1A, becomes a single-ended injected noise in a dynamic (touch) condition, as shown in FIGS. 1B and 1C. In FIG. 1A, noise source Vns comprises common mode noise coupled to the product/device ground (labeled p) and earth ground. In some environments, this common mode noise can be in the range of 40-50 volts peak to peak. Stimulation source Vstim, the drive and sense lines, and charge amplifier CA generally correspond to the sensor configuration described in U.S. application Ser. No. 11/649,998. As illustrated in FIG. 1A, noise source Vns does not affect operation of the touch panel when sensor configuration 100 is operating in a no-touch condition.

However, FIGS. 1B and 1C illustrate how a user's finger can create a circuit path that can affect operation of the touch panel in a touch condition. In particular, when touching the panel at the sensor intersecting the drive and sense lines, the finger capacitively couples to the driving element coupled to the drive line (forming a finger-to-drive capacitance Cfd), the sensing element coupled to the sense line (forming a finger-to-sense capacitance Cfs) and earth through the user's body (forming a body-to-earth capacitance Cbe). An equivalent representation of this circuit path is illustrated in FIG. 1C. By providing a return path to earth ground for the noise source Vns, the finger capacitively couples noise source Vns between device ground and the sensing element. This capacitive coupling is represented by Ceq, which represents the finger-to-sense capacitance Cfs and the body-to-earth capacitance Cbe coupled in series. Due to this coupling, noise source Vns effectively acts as a stimulating power source for the sensing element similar to Vstim, and can inject a charge into the sensing element in the same manner as Vstim. Accordingly, conventional sensing of the sensing element cannot determine which source is providing the stimulation.

A sensing element stimulated by a noise source can cause adverse effects to touch panel operation. In one example, the stimulating noise source can cause false touch readings for untouched locations on the touch panel. This can occur when the noise source stimulates a different sensor (due to a touch at that sensor) from the sensor location currently being stimulated by a drive line at an untouched location in the touch panel. Since different sensors can share the same sense line in certain touch panel configurations, a false touch event can be indicated when a panel-stimulated signal generated on a sense line by a sensing element at a non-touched sensor is combined with a noise-stimulated signal generated on the same sense line by a sensing element at a different touched sensor. Since a touch event is indicated at the intersection between the panel-stimulated drive line and the touch-indicating sense line, the panel can identify the wrong sensor as the location of the touch. In another example, the stimulating noise source can cause saturation of analog touch detection circuitry, thereby preventing the circuitry from recognizing a touch event.

Touch detection circuitry according to embodiments of the invention can reduce the adverse effects of the injected noise by performing a sensing operation at each sensor in both a panel-stimulated and non panel-stimulated state. By sensing in a non-stimulated state, a baseline detection signal can be established. This baseline signal can be compared against a signal generated by sensing in the stimulated state to determine whether a touch event has occurred. Unlike conventional touch panels that sense touch only when a stimulus is applied to the sensor, a touch panel according to embodiments of the invention can detect a touch event by sensing touch in a non-stimulated state to quantify a noise level injected into the touch panel by the touch, and subtracting that noise level from a detection signal sensed in the stimulated state.

In one embodiment, a sensing operation can be performed for a particular sensor at two successive time periods within a single scan cycle. In one time period, a sensing operation can be performed without the corresponding drive line being stimulated. In the other time period, the sensing operation can be performed with the corresponding drive line being stimulated. This embodiment can be implemented using the sensing configuration described above, wherein each sensing operation results in a preliminary value. The two preliminary values that result from the single scan cycle can be subtracted to produce a final value used to indicate whether or not a touch has occurred. Although this embodiment removes the influence of the noise source from the final touch detection result value, it can halve the sampling rate for the touch panel due to the time required to perform a sensing operation for each sensor twice in one scan cycle. This embodiment can also require that the signal path in the analog channel (a.k.a. sense or charge amplifier) handle the full amplitude of the analog channel's reference voltage, based on both the stimulation source and the noise source when sensing in the panel-stimulated state to ensure proper operation.

Figure 2A:
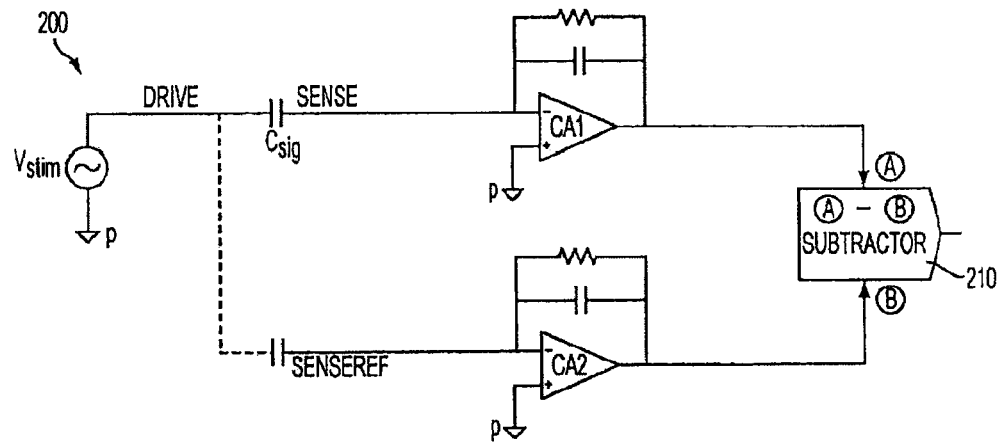
FIG. 2A illustrates an exemplary noise-reducing sensing configuration in a steady-state (no-touch) condition according to one embodiment of the invention.

In another embodiment, a sensing electrode configuration can be provided that enables a sensing operation to be performed for a particular sensor in both a panel-stimulated and non panel-stimulated state concurrently. FIG. 2A illustrates sensor configuration 200 including a drive line, two sense lines (sense and senseref) each coupled to a charge amplifier (CA1 and CA2 respectively), and subtractor 210 (which may be part of a panel subsystem). A driving element (not shown) can be coupled to the drive line, a first sensing element (not shown) can be coupled to the sense line, and a second sensing element (not shown) can be coupled to the senseref line. The dotted line indicates that the driving element and second sensing element are arranged such that any capacitive relationship between the two is minimal, if existing, when either element is stimulated. This enables the sense line to generate a signal representing a stimulation response to both the stimulation source (Vstim) and a noise source (and the finger's contribution to each response, if touching), while enabling the senseref line to generate a signal representing a stimulation response only to the noise source (and the finger's contribution to that response, if touching). By subtracting these signals with subtractor 210, the sensor configuration can produce a touch detection signal devoid of the influence of any noise on the sensing elements.

Figure 2B:
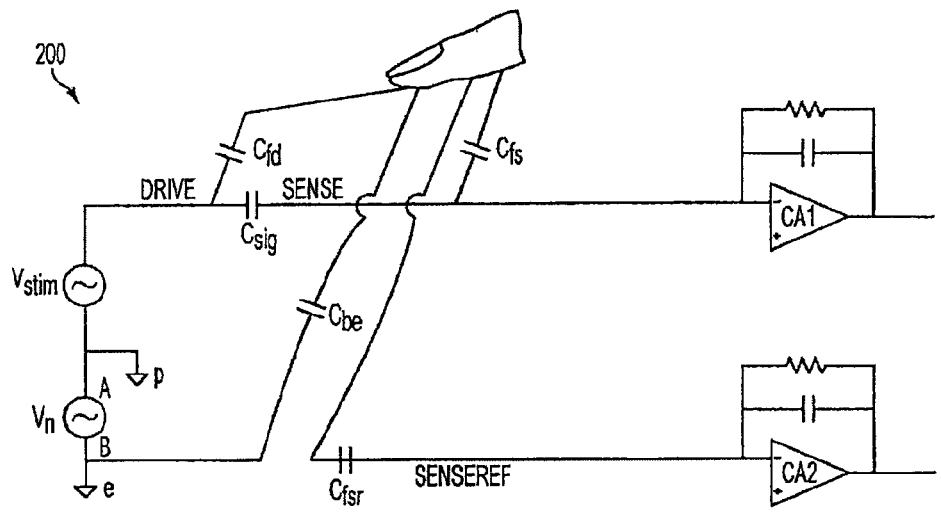
FIG. 2B illustrates an exemplary noise-reducing sensing configuration in a dynamic (touch) condition according to one embodiment of the invention.
Figure 2C:
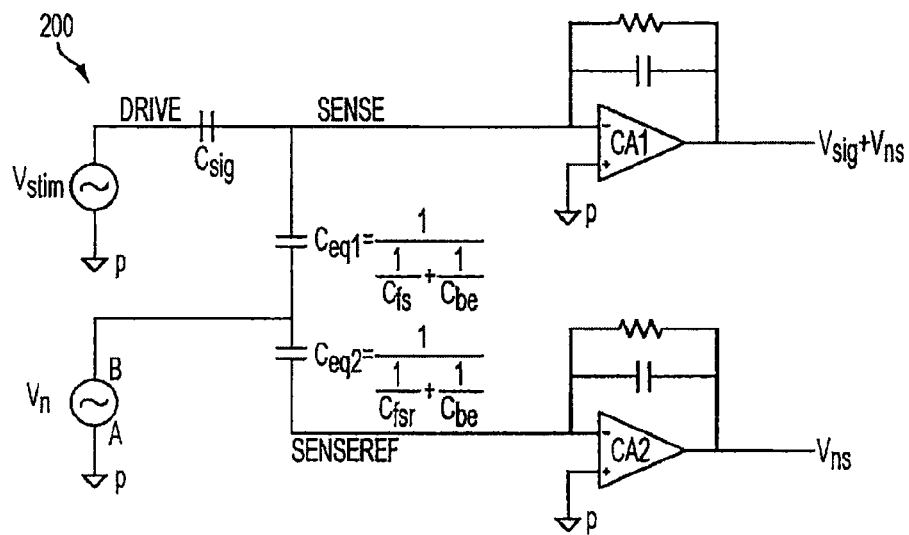
FIG. 2C illustrates an exemplary noise-reducing sensing configuration in a dynamic (touch) condition according to one embodiment of the invention.

FIGS. 2B and 2C illustrate how sensing configuration 200 handles common mode noise turned into single-ended injected noise due to a touch on the touch panel. In FIG. 2B, the touch causes the finger to capacitively couple to the driving element coupled to the drive line (forming finger-to-drive capacitance Cfd), the sensing element coupled to the sense line (forming a finger-to-sense capacitance Cfs) and earth through the user's body (forming a body-to-earth capacitance Cbe). The touch also causes the finger to capacitively couple to the sensing element coupled to the senseref line (forming finger-to-senseref capacitance Cfsr). An equivalent representation of this circuit path is illustrated in FIG. 2C. By providing a return path to earth ground for the noise source Vns, the finger capacitively couples noise source Vns between device ground and the sensing element coupled to the sense line. This capacitive coupling is represented by Ceq1, which represents the finger-to-sense capacitance Cfs and the body-to-earth capacitance Cbe coupled in series. The return path also causes the finger to capacitively couple noise source Vns between device ground and the sensing element coupled to the senseref line. This capacitive coupling is represented by Ceq2, which represents the finger-to-senseref capacitance Cfsr and the body-to-earth capacitance Cbe coupled in series. Due to this coupling, noise source Vns can act as a stimulating source for both sensing elements. To enable subtractor 210 to reduce the influence of noise source Vns as much as possible, the sensing elements can be arranged such that Ceq1=Ceq2, which occurs when the finger-to-sense capacitance Cfs is equal to finger-to-senseref capacitance Cfsr.

Figure 2D:
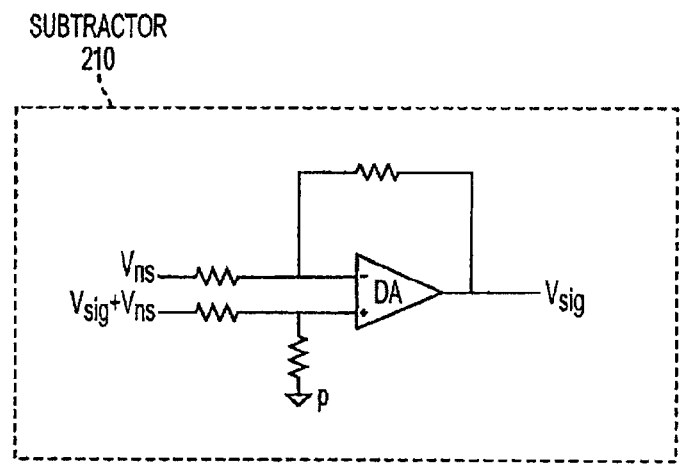
FIG. 2D illustrates an exemplary subtractor according to one embodiment of the invention.

FIG. 2D illustrates an exemplary embodiment of subtractor 210. In the illustrated embodiment, subtractor 210 can comprise a conventional differential amplifier DA configured to subtract the output signal from CA2 (Vout_ns) coupled to its inverting input from the output signal from CA1 (Vout_stim+Vout_ns) coupled to its non-inverting input. Although a differential amplifier is illustrated herein, subtractor 210 can comprise any component that can subtract two input signals and output a difference signal.

The manner in which the driving and sensing elements of sensing configuration 200 can be arranged may be widely varied. In order to ensure proper operation, the elements can be arranged relative to one another such that, when Vstim stimulates the driving element and a finger is touching the touch panel surface at the location of the sensor, a capacitance formed between the finger and the first sensing element is substantially similar to a capacitance formed between the finger and the second sensing element, and a capacitance formed between the driving element and the second sensing element is substantially less than a capacitance formed between the driving element and the first sensing element.

Figure 3A:
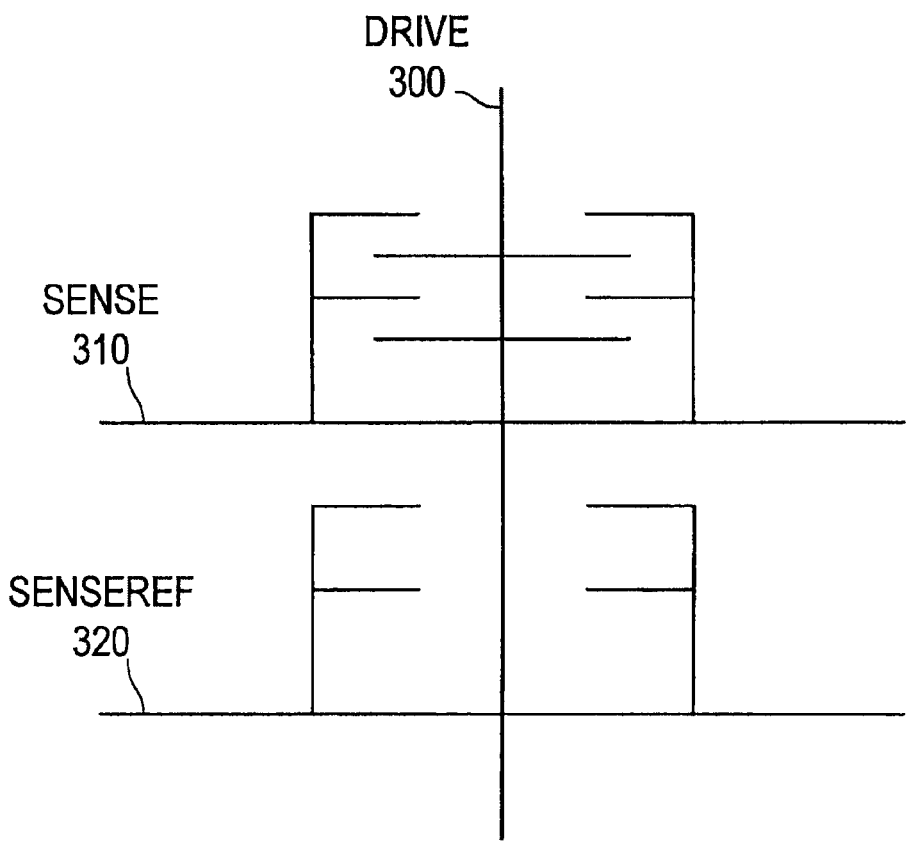
FIG. 3A illustrates an exemplary sensor arrangement according to one embodiment of the invention.
Figure 3B:
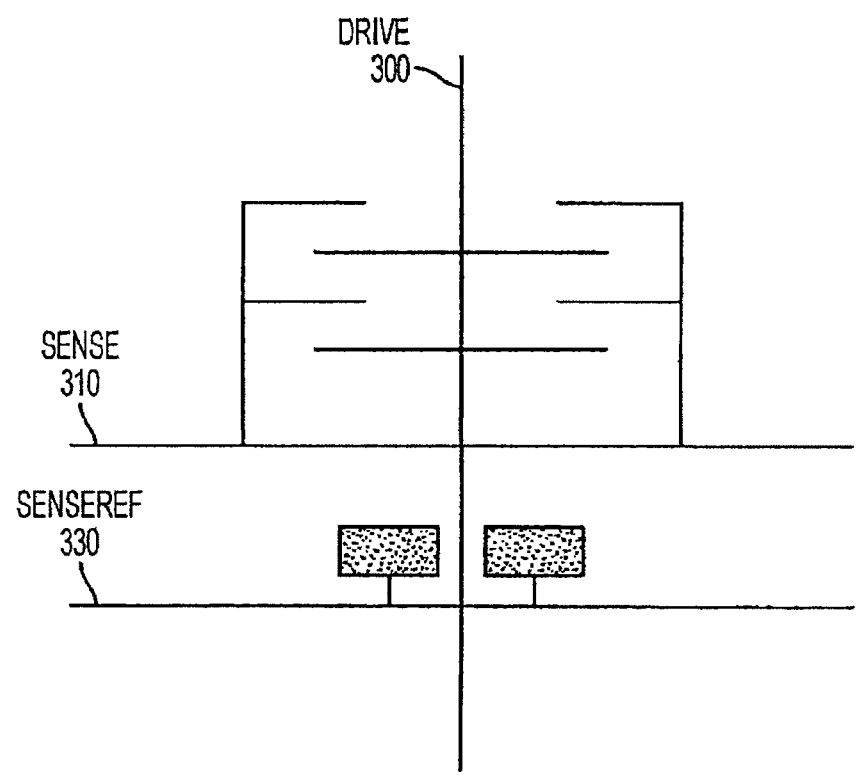
FIG. 3B illustrates an exemplary sensor arrangement according to one embodiment of the invention.

FIGS. 3A and 3B illustrate exemplary sensor arrangements that can implement sensing configuration 200. In FIG. 3A both sensing elements (sense element 310 and senseref element 320) can occupy the same layer in the touch panel, and be arranged in proximity to the driving element (drive 300) occupying a separate layer. When occupying the same layer, both sensing elements can be formed to have the same or similar area in order to ensure that a similar capacitance can be formed between each sensing element and a finger touching the touch panel screen at the sensor location. In the embodiment illustrated in FIG. 3A, the sensing element pattern is duplicated for each sensing element. In FIG. 3B, the noise reference sensing element (senseref 330) comprises a different shape than that of sense element 310, but can be formed to have the same or similar area as sense element 310. It should be noted that drive element 300 can be arranged relative to the noise reference sensing element (i.e., senseref 320 or senseref 330) to minimize any capacitive coupling between the two.

The size and positions of the sensing elements relative to one another may be widely varied. For example, the size of the sensing elements can be designed to ensure sufficient capacitive coupling between each sensing element and a finger touching the panel surface at the sensor. The positions of the sensing elements can be arranged relative to one another to minimize any difference in capacitance that can be formed between the finger and each element as the finger move across the touch panel surface at the sensor location. In another embodiment, one sensing element can occupy one layer, and the other sensing element can occupy a second layer. In this embodiment, the sensing layer arranged at a further distance from the touch panel surface can be formed to have a larger area than the sensing layer arranged at the closer distance to the touch panel surface. The larger area can ensure that the further sensing element forms the same or similar capacitance with a touching finger as the closer sensing element. The position of the driving element relative to the further sensing element can be adjusted to minimize any capacitive coupling between the two.

Figure 3C:
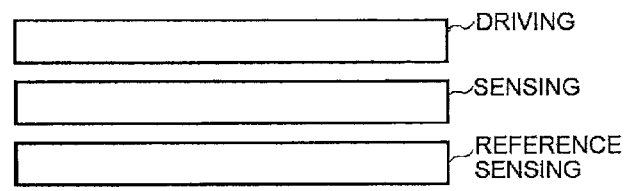
FIG. 3C illustrates an exemplary sensor arrangement in which the driving element, the sensing element and the reference sensing element occupy different layers.
Figure 3D:
FIG. 3D illustrates an exemplary sensor arrangement in which the driving element occupies a first layer and the sensing element and reference sensing element occupy a second element.

FIG. 3C illustrates an exemplary sensor arrangement in which the driving element, the sensing element and the reference sensing element occupy different layers; and FIG. 3D illustrates an exemplary sensor arrangement in which the driving element occupies a first layer and the sensing element and reference sensing element occupy a second element.

Figure 4:
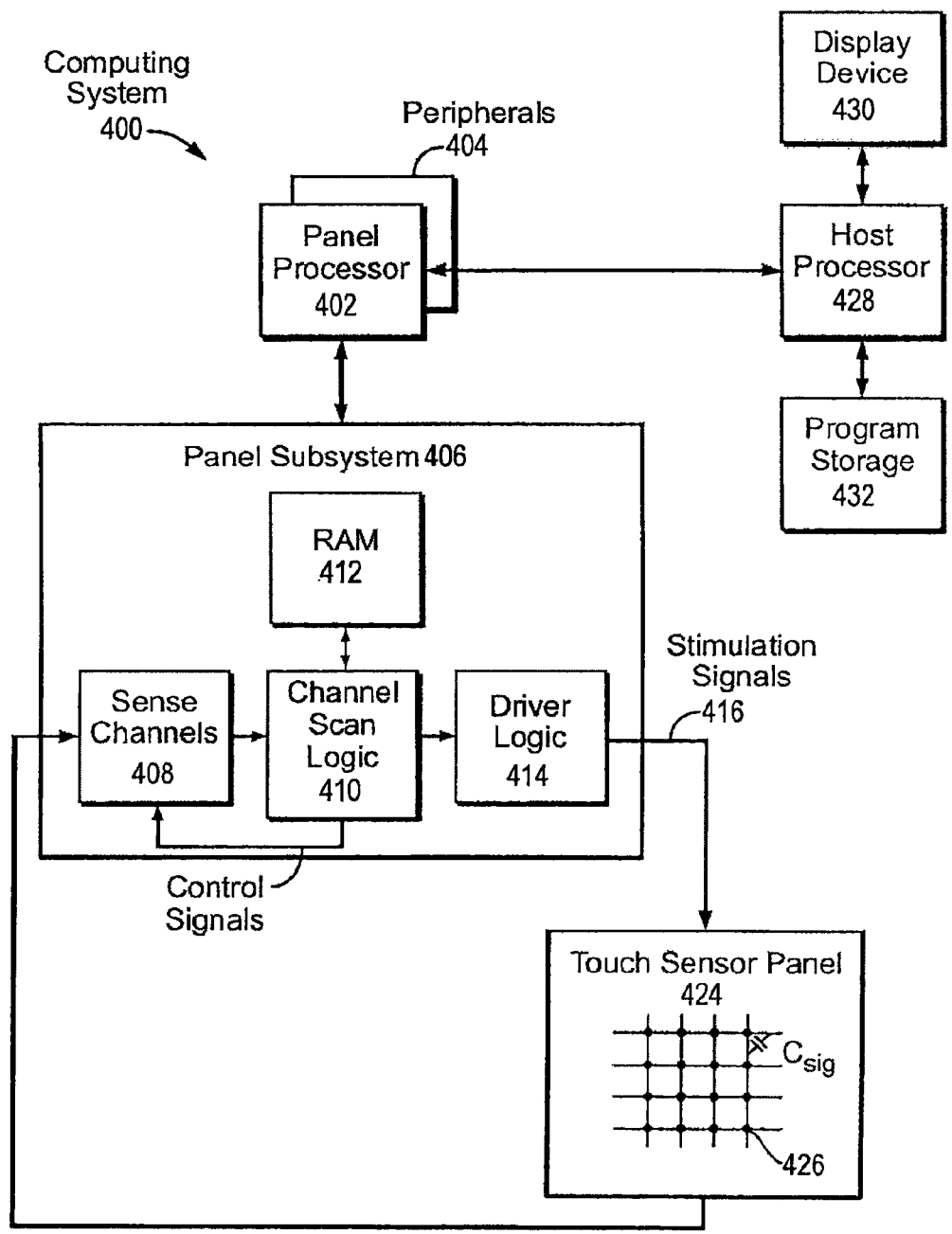
FIG. 4 illustrates an exemplary computing system including a touch sensor panel according to embodiments of the invention

FIG. 4 illustrates exemplary computing system 400 that can include one or more of the embodiments of the invention described above. Computing system 400 can include one or more panel processors 402 and peripherals 404, and panel subsystem 406. Peripherals 404 can include, but are not limited to, random access memory (RAM) or other types of memory or storage, watchdog timers and the like. Panel subsystem 406 can include, but is not limited to, one or more sense channels 408, channel scan logic 410 and driver logic 414. Channel scan logic 410 can access RAM 412, autonomously read data from the sense channels and provide control for the sense channels. In addition, channel scan logic 410 can control driver logic 414 to generate stimulation signals 416 at various frequencies and phases that can be selectively applied to drive lines of touch sensor panel 424. In some embodiments, panel subsystem 406, panel processor 402 and peripherals 404 can be integrated into a single application specific integrated circuit (ASIC).

Touch sensor panel 424 can include a capacitive sensing medium having a plurality of drive lines and a plurality of sense lines, although other sensing media can also be used. Each intersection of drive and sense lines can represent a capacitive sensing node and can be viewed as picture element (pixel) 426, which can be particularly useful when touch sensor panel 424 is viewed as capturing an "image" of touch. (In other words, after panel subsystem 406 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 424 can drive sense channel 408 (also referred to herein as an event detection and demodulation circuit) in panel subsystem 406. The touch sensor panel can perform sensing operations at each sensor in both a stimulated and non-stimulated state in order to reject injected noise according to embodiments of the invention.

Computing system 400 can also include host processor 428 for receiving outputs from panel processor 402 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 428 can also perform additional functions that may not be related to panel processing, and can be coupled to program storage 432 and display device 430 such as an LCD display for providing a UI to a user of the device. Display device 430 together with touch sensor panel 424, when located partially or entirely under the touch sensor panel, can form touch screen 418.

Note that one or more of the functions described above can be performed by firmware stored in memory (e.g. one of the peripherals 404 in FIG. 4) and executed by panel processor 402, or stored in program storage 432 and executed by host processor 428. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 5A:
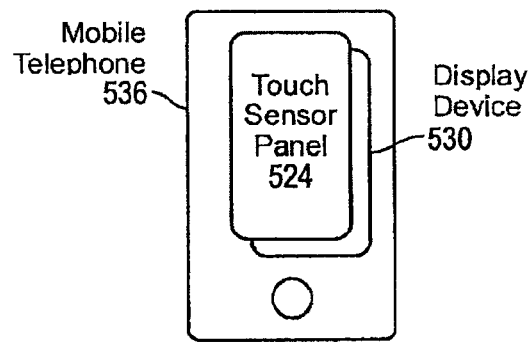
FIG. 5A illustrates an exemplary mobile telephone having a touch sensor panel according to embodiments of the invention.

FIG. 5A illustrates exemplary mobile telephone 536 that can include touch sensor panel 524 and display device 530, the touch sensor panel configured to reject noise according to embodiments of the invention.

Figure 5B:
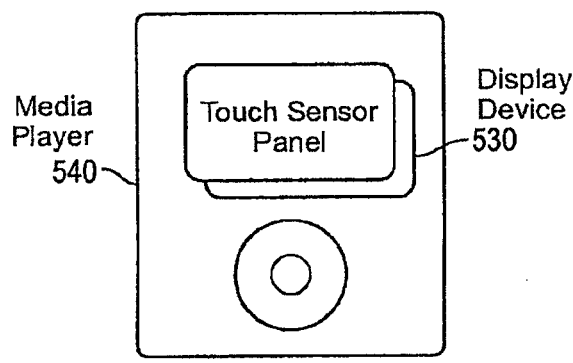
FIG. 5B illustrates an exemplary digital media player having a touch sensor panel according to embodiments of the invention.

FIG. 5B illustrates exemplary digital media player 540 that can include touch sensor panel 524 and display device 530, the touch sensor panel configured to reject noise according to embodiments of the invention.

Figure 5C:
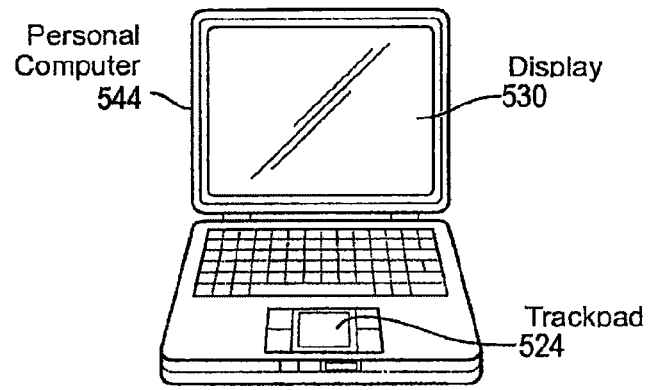
FIG. 5C illustrates an exemplary personal computer having a touch sensor panel (trackpad) and/or display according to embodiments of the invention.

FIG. 5C illustrates exemplary personal computer 544 that can include touch sensor panel (trackpad) 524 and display 530, the touch sensor panel and/or display of the personal computer (in embodiments where the display is part of a touch screen) configured to reject noise according to embodiments of the invention. The mobile telephone, media player and personal computer of FIGS. 5A, 5B and 5C can achieve improved touch panel detection by rejecting injected noise according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A computing device comprising:
a touch sensor panel including a plurality of sensors, each sensor comprising a driving element, a sensing element and a reference sensing element, wherein the driving element comprises a plurality of first fingers and the sensing element comprises a plurality of second fingers, the first and second fingers being alternately disposed adjacent one another in a first area on the touch sensor panel, the reference sensing element being disposed in a second area, different from and outside of the first area, on the touch sensor panel; and
panel subsystem logic configured for filtering a first signal using a second signal to reduce noise injected into a sensing element of a sensor by a touch caused by an object,
wherein:
the driving element, the sensing element and the reference sensing element occupy different layers and are arranged relative to one another such that, upon stimulation of the driving element and touching of the touch sensor panel by the object, a capacitance formed between the object and the sensing element is substantially similar to a capacitance formed between the object and the reference sensing element, and a capacitance formed between the driving element and the reference sensing element is substantially less than a capacitance formed between the driving element and the sensing element,
the first signal is generated by the sensing element of the sensor in response to a stimulus applied to a driving element of the sensor, and
the second signal is generated by a reference sensing element of the sensor.

2. The computing device of claim 1, wherein the touch sensor panel is grounded to the computing device and the object is grounded to earth.

3. A method for reducing noise coupled into a touch sensor panel from an object, comprising:
applying a stimulus to a driving element of a sensor in the touch sensor panel to enable detection of a touch on the touch sensor panel by the object; and
filtering a first signal using a second signal to reduce noise injected into a sensing element of the sensor by the touch caused by the object,
wherein:
the first signal is generated by the sensing element of the sensor in response to the stimulus,
the second signal is generated by a reference sensing element of the sensor,
the driving element comprises a plurality of first fingers and the sensing element comprises a plurality of second fingers, the first and second fingers being alternately disposed adjacent one another in a first area on the touch sensor panel,
the reference sensing element is disposed in a second area, different from and outside of the first area, on the touch sensor panel, and
the driving element, the sensing element and the reference sensing element occupy different layers and are arranged relative to one another such that, upon stimulation of the driving element and touching of the touch sensor panel by the object, a capacitance formed between the object and the sensing element is substantially similar to a capacitance formed between the object and the reference sensing element, and a capacitance formed between the driving element and the reference sensing element is substantially less than a capacitance formed between the driving element and the sensing element.

4. The method of claim 3, wherein the touch sensor panel is grounded to a computing device and the object is grounded to earth.

5. A touch sensor panel for detecting a touch by an object, the touch sensor panel containing a plurality of sensors comprising:
a driving element comprising a plurality of first fingers;

a sensing element comprising a plurality of second fingers, the first and second fingers being alternately disposed adjacent one another in a first area on the touch sensor panel; and a reference sensing element disposed in a second area, different from and outside of the first area, on the touch sensor panel, wherein the driving element, the sensing element and the reference sensing element occupy different layers and are arranged relative to one another such that, upon stimulation of the driving element and touching of the touch sensor panel by the object, a capacitance formed between the object and the sensing element is substantially similar to a capacitance formed between the object and the reference sensing element, and a capacitance formed between the driving element and the reference sensing element is substantially less than a capacitance formed between the driving element and the sensing element.

6. The touch sensor panel of claim 5, wherein each sensor within a group of sensors includes a driving element, a sensing element and a reference sensing element.

7. The touch sensor panel of claim 5, the touch sensor panel being incorporated within a computing device.

8. A mobile telephone comprising:

a touch sensor panel including a plurality of sensors, each sensor comprising a driving element, a sensing element and a reference sensing element, wherein the driving element comprises a plurality of first fingers and the sensing element comprises a plurality of second fingers, the first and second fingers being alternately disposed adjacent one another in a first area on the touch sensor panel, the reference sensing element being disposed in a second area, different from and outside of the first area, on the touch sensor panel; and panel subsystem logic configured for filtering a first signal using a second signal to reduce noise injected into a sensing element of a sensor by a touch caused by an object, wherein:

the driving element, the sensing element and the reference sensing element occupy different layers and are arranged relative to one another such that, upon stimulation of the driving element and touching of the touch sensor panel by the object, a capacitance formed between the object and the sensing element is substantially similar to a capacitance formed between the object and the reference sensing element, and a capacitance formed between the driving element and the reference sensing element is substantially less than a capacitance formed between the driving element and the sensing element, the first signal is generated by the sensing element of the sensor in response to a stimulus applied to a driving element of the sensor, and the second signal is generated by a reference sensing element of the sensor.

9. A portable media player comprising:

a touch sensor panel including a plurality of sensors, each sensor comprising a driving element, a sensing element and a reference sensing element, wherein the driving element comprises a plurality of first fingers and the sensing element comprises a plurality of second fingers, the first and second fingers being alternately disposed adjacent one another in a first area on the touch sensor panel, the reference sensing element being disposed in a second area, different from and outside of the first area, on the touch sensor panel; and panel subsystem logic configured for filtering a first signal using a second signal to reduce noise injected into a sensing element of a sensor by a touch caused by an object, wherein:

the driving element, the sensing element and the reference sensing element occupy different layers and are arranged relative to one another such that, upon stimulation of the driving element and touching of the touch sensor panel by the object, a capacitance formed between the object and the sensing element is substantially similar to a capacitance formed between the object and the reference sensing element, and a capacitance formed between the driving element and the reference sensing element is substantially less than a capacitance formed between the driving element and the sensing element, the first signal is generated by the sensing element of the sensor in response to a stimulus applied to a driving element of the sensor, and the second signal is generated by a reference sensing element of the sensor.

10. A computing device comprising:

a touch sensor panel including a plurality of sensors, each sensor comprising a driving element, a sensing element and a reference sensing element, wherein the driving element comprises a plurality of first fingers and the sensing element comprises a plurality of second fingers, the first and second fingers being alternately disposed adjacent one another in a first area on the touch sensor panel, the reference sensing element being disposed in a second area, different from and outside of the first area, on the touch sensor panel, a size and shape of the sensing element and a size and shape of the reference sensing element being the same; and panel subsystem logic configured for filtering a first signal using a second signal to reduce noise injected into a sensing element of a sensor by a touch caused by an object, wherein:

the first signal is generated by the sensing element of the sensor in response to a stimulus applied to a driving element of the sensor, and the second signal is generated by a reference sensing element of the sensor.

11. The computing device of claim 10, wherein the touch sensor panel is grounded to the computing device and the object is grounded to earth.

12. The computing device of claim 10, wherein the driving element, the sensing element and the reference sensing element are arranged relative to one another such that, upon stimulation of the driving element and touching of the touch sensor panel by the object, a capacitance formed between the object and the sensing element is substantially similar to a capacitance formed between the object and the reference sensing element, and a capacitance formed between the driving element and the reference sensing element is substantially less than a capacitance formed between the driving element and the sensing element.

13. The computing device of claim 12, wherein the driving element, the sensing element and the reference sensing element occupy the same layer.

14. The computing device of claim 12, wherein the driving element, the sensing element and the reference sensing element occupy different layers.

15. The computing device of claim 12, wherein the driving element occupies a first layer, and the sensing element and the reference sensing element occupy a second layer.

16. A method for reducing noise coupled into a touch sensor panel from an object, comprising:
applying a stimulus to a driving element of a sensor in the touch sensor panel to enable detection of a touch on the touch sensor panel by the object; and
filtering a first signal using a second signal to reduce noise injected into a sensing element of the sensor by the touch caused by the object,
wherein:
the first signal is generated by the sensing element of the sensor in response to the stimulus,
the second signal is generated by a reference sensing element of the sensor,
the driving element comprises a plurality of first fingers and the sensing element comprises a plurality of second fingers, the first and second fingers being alternately disposed adjacent one another in a first area on the touch sensor panel,
a size and shape of the sensing element and a size and shape of the reference sensing element are the same, and
the reference sensing element is disposed in a second area, different from and outside of the first area, on the touch sensor panel.

17. The method of claim 16, wherein the touch sensor panel is grounded to a computing device and the object is grounded to earth.

18. The method of claim 16, wherein
the driving element, the sensing element and the reference sensing element are arranged relative to one another such that, upon stimulation of the driving element and touching of the touch sensor panel by the object,
a capacitance formed between the object and the sensing element is substantially similar to a capacitance formed between the object and the reference sensing element, and
a capacitance formed between the driving element and the reference sensing element is substantially less than a capacitance formed between the driving element and the sensing element.

19. A touch sensor panel for detecting a touch by an object, the touch sensor panel containing a plurality of sensors comprising:
a driving element comprising a plurality of first fingers;
a sensing element comprising a plurality of second fingers, the first and second fingers being alternately disposed adjacent one another in a first area on the touch sensor panel; and
a reference sensing element disposed in a second area, different from and outside of the first area, on the touch sensor panel, a size and shape of the sensing element and a size and shape of the reference sensing element being the same,
wherein the driving element, the sensing element and the reference sensing element are arranged relative to one another such that, upon stimulation of the driving element and touching of the touch sensor panel by the object,
a capacitance formed between the object and the sensing element is substantially similar to a capacitance formed between the object and the reference sensing element, and
a capacitance formed between the driving element and the reference sensing element is substantially less than a capacitance formed between the driving element and the sensing element.

20. The touch sensor panel of claim 19, wherein the driving element, the sensing element and the reference sensing element occupy the same layer.

21. The touch sensor panel of claim 19, wherein the driving element, the sensing element and the reference sensing element occupy different layers.

22. The touch sensor panel of claim 19, wherein each sensor within a group of sensors includes a driving element, a sensing element and a reference sensing element.

23. The touch sensor panel of claim 19, the touch sensor panel being incorporated within a computing device.

24. A mobile telephone comprising:
a touch sensor panel including a plurality of sensors, each sensor comprising a driving element, a sensing element and a reference sensing element, wherein the driving element comprises a plurality of first fingers and the sensing element comprises a plurality of second fingers, the first and second fingers being alternately disposed adjacent one another in a first area on the touch sensor panel, the reference sensing element being disposed in a second area, different from and outside of the first area, on the touch sensor panel, a size and shape of the sensing element and a size and shape of the reference sensing element being the same; and
panel subsystem logic configured for filtering a first signal using a second signal to reduce noise injected into a sensing element of a sensor by a touch caused by an object,
wherein:
the first signal is generated by the sensing element of the sensor in response to a stimulus applied to a driving element of the sensor, and
the second signal is generated by a reference sensing element of the sensor.

25. A portable media player comprising:
a touch sensor panel including a plurality of sensors, each sensor comprising a driving element, a sensing element and a reference sensing element, wherein the driving element comprises a plurality of first fingers and the sensing element comprises a plurality of second fingers, the first and second fingers being alternately disposed adjacent one another in a first area on the touch sensor panel, the reference sensing element being disposed in a second area, different from and outside of the first area, on the touch sensor panel, a size and shape of the sensing element and a size and shape of the reference sensing element being the same; and
panel subsystem logic configured for filtering a first signal using a second signal to reduce noise injected into a sensing element of a sensor by a touch caused by an object,
wherein:
the first signal is generated by the sensing element of the sensor in response to a stimulus applied to a driving element of the sensor, and
the second signal is generated by a reference sensing element of the sensor.

* * * * *